United States Patent
Lee et al.

(10) Patent No.: US 11,477,739 B2
(45) Date of Patent: Oct. 18, 2022

(54) METHOD AND APPARATUS FOR DISTRIBUTED CONTROL OF BASE STATION POWER IN WIRELESS COMMUNICATION SYSTEM

(71) Applicant: Korea University Research and Business Foundation, Seoul (KR)

(72) Inventors: Inkyu Lee, Seoul (KR); Sang Hyun Lee, Seoul (KR); Min Tae Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/381,351

(22) Filed: Jul. 21, 2021

(65) Prior Publication Data

US 2022/0240198 A1    Jul. 28, 2022

(30) Foreign Application Priority Data

Jan. 19, 2021    (KR) .......................... 10-2021-0007517

(51) Int. Cl.
 *H04W 52/18*    (2009.01)
 *H04W 52/34*    (2009.01)
 *H04W 52/22*    (2009.01)

(52) U.S. Cl.
 CPC ....... *H04W 52/346* (2013.01); *H04W 52/225* (2013.01)

(58) Field of Classification Search
 CPC .. H04W 52/346; H04W 52/235; H04W 52/18
 (Continued)

(56) References Cited

U.S. PATENT DOCUMENTS

| | | | |
|---|---|---|---|
| 7,853,282 B2 | 12/2010 | Wu et al. | |
| 8,335,534 B2 * | 12/2012 | Zhang | H04W 52/281 455/63.1 |

(Continued)

FOREIGN PATENT DOCUMENTS

| | | |
|---|---|---|
| KR | 10-2013-0033386 A | 4/2013 |
| KR | 10-2014-0009494 A | 1/2014 |

(Continued)

OTHER PUBLICATIONS

Sohn, Illsoo. "Distributed downlink power control by message-passing for very large-scale networks." *International Journal of Distributed Sensor Networks* vol. 11 Issue 8 (Mar. 3, 2015): pp. 1-12.

(Continued)

*Primary Examiner* — Hai V Nguyen
(74) *Attorney, Agent, or Firm* — NSIP Law (57) ABSTRACT

The present disclosure relates to a method and an apparatus of controlling base station power in a distributive manner in a wireless communication system. A method according to an embodiment of the present disclosure may include determining $u_i$ indicating a turn-on or turn-off state of an i-th base station based on mutual message passing with an adjacent base station in the i-th base station among B base stations; determining $x_{ia}$ indicating whether a signal is transmitted to an a-th terminal among N terminals from the i-th base station; and obtaining an optimized value of the $u_i$ and the $x_{ia}$ which minimize total energy consumption consumed by the B base stations and simultaneously, maximize a data rate of the B base stations.

10 Claims, 8 Drawing Sheets

(58) Field of Classification Search
USPC .......................................................... 455/522
See application file for complete search history.

(56) References Cited

U.S. PATENT DOCUMENTS

| | | | |
|---|---|---|---|
| 8,675,511 B2 | 3/2014 | Gorokhov et al. | |
| 9,614,728 B2 | 4/2017 | Faraboschi et al. | |
| 11,178,662 B2* | 11/2021 | Chen ..................... | H04W 40/12 |
| 2010/0009710 A1* | 1/2010 | Zhang ................ | H04W 52/241 |
| | | | 455/522 |
| 2012/0046026 A1* | 2/2012 | Chande ................ | H04W 52/18 |
| | | | 455/422.1 |
| 2014/0287734 A1* | 9/2014 | Lee .................. | H04W 52/0206 |
| | | | 455/418 |
| 2019/0141708 A1* | 5/2019 | Chen ..................... | H04W 40/12 |

FOREIGN PATENT DOCUMENTS

| | | |
|---|---|---|
| KR | 10-2014-0116980 A | 10/2014 |
| KR | 10-1563865 B1 | 10/2015 |

OTHER PUBLICATIONS

Korean Notice of Grant dated Jan. 24, 2022 in corresponding Korean Patent Application No. 10-2021-0007517 (5 pages in Korean).
Lee, Sang Hyun et al., "Belief Propagation for Energy Efficiency Maximization in Wireless Heterogeneous Networks", *IEEE Transactions on Wireless Communications*, vol. 20, Issue 1, 2021 (pp. 1-14).

\* cited by examiner

METHOD AND APPARATUS FOR DISTRIBUTED CONTROL OF BASE STATION POWER IN WIRELESS COMMUNICATION SYSTEM

CROSS-REFERENCE TO RELATED APPLICATIONS

This application claims the benefit of earlier filing date and right of priority to Korean Application No. 10-2021-0007517, filed on Jan. 19, 2021, the contents of which are all hereby incorporated by reference herein in their entirety.

TECHNICAL FIELD

The present disclosure relates to a wireless communication system, and specifically relates to a method and an apparatus of controlling base station power in a distributive manner in a wireless communication system.

BACKGROUND ART

It has been recently required to support a higher data rate to satisfy demands for new and various services in a wireless communication system. It is expected that network energy consumption will increase to improve a data rate. For example, compared with a previous wireless communication system, it is expected that total network energy consumption will increase by 150 to 170% in a 5G wireless communication system. In this regard, network operators are seeking for a method for improving or optimizing energy efficiency which is environmentally and economically sustainable while supporting new and various services.

To increase energy efficiency, a data rate transmitted by a base station to a terminal shall be improved while reducing total network energy consumption. One of the most fundamental methods for reducing total energy consumption is to turn off a base station, which may cause loss of a data rate. Accordingly, an optimization technology which controls a power state of a base station, a technology which adjusts a power state of a base station by using a technology which expands and reduces a cell, a technology which supports services to a terminal through cooperation between each base station by turning off a base station that coverage is overlapped each other, etc. have been discussed.

Such traditional methods require a centralized control method to control power of each base station in a wireless communication system that base stations in a plurality of or a variety of methods exist. In a centralized control method, it is assumed that a central processing node, a higher node of a base station, designates a transmission and reception relation between each base station and terminal. But, for a centralized control method, a time delay is generated due to information exchange between a plurality of base stations and a central processing node and improvement of total network energy efficiency is limited due to a processing burden of a central processing node and resource consumption for information exchange. Accordingly, a new method which controls power of a plurality of base stations in a distributive manner by getting out of a centralized method is required.

DISCLOSURE

Technical Problem

A technical problem of the present disclosure is to provide a method and an apparatus of effectively controlling power of each base station in a distributive manner based on message exchange between base stations.

An additional technical problem of the present disclosure is to provide a method and an apparatus of effectively allocating a terminal to each base station based on base station power control.

The technical objects to be achieved by the present disclosure are not limited to the above-described technical objects, and other technical objects which are not described herein will be clearly understood by those skilled in the pertinent art from the following description.

Technical Solution

A method of controlling power of a base station in a distributive manner in a wireless communication system according to an aspect of the present disclosure may include determining $u_i$ indicating a turn-on or turn-off state of an i-th base station based on mutual message passing with an adjacent base station in the i-th base station among B base stations; determining $x_{ia}$ indicating whether a signal is transmitted to an a-th terminal among N terminals from the i-th base station; and obtaining an optimized value of the $u_i$ and the $x_{ia}$ which minimize total energy consumption consumed by the B base stations and simultaneously, maximize a data rate of the B base stations.

A base station apparatus of controlling power in a distributive manner in a wireless communication system according to an additional aspect of the present disclosure includes a transceiver; a memory; and a processor and the processor may be configured to determine $u_i$ indicating a turn-on or turn-off state of an i-th base station based on mutual message passing with an adjacent base station in the i-th base station among B base stations; determining $x_{ia}$ indicating whether a signal is transmitted to an a-th terminal among N terminals from the i-th base station; and obtaining an optimized value of the $u_i$ and the $x_{ia}$ which minimize total energy consumption consumed by the B base stations and simultaneously, maximize a data rate of the B base stations.

The characteristics which are simply summarized above for the present disclosure are just an illustrative aspect of a detailed description of the after-described present disclosure and do not limit a scope of the present disclosure.

Technical Effects

According to the present disclosure, a method and an apparatus of effectively controlling power of each base station in a distributive manner based on message exchange between base stations may be provided.

According to the present disclosure, a method and an apparatus of effectively allocating a terminal to each base station based on base station power control may be provided.

Effects achievable by the present disclosure are not limited to the above-described effects, and other effects which are not described herein may be clearly understood by those skilled in the pertinent art from the following description.

DESCRIPTION OF DIAGRAMS

BEST MODE

Hereinafter, an embodiment of the present disclosure will be described in detail so that those skilled in the pertinent art from the following description can easily carry it out by referring to an attached diagram. However, the present disclosure may be implemented in a variety of different forms and is not limited to an embodiment which is described herein.

In describing an embodiment of the present disclosure, when it is determined that a detailed description on a disclosure configuration or function could cloud a gist of the present disclosure, a detailed description thereon is omitted. In addition, a part irrelevant to a description on the present disclosure in a diagram is omitted and a similar diagram code is attached to a similar part.

In the present disclosure, when an element is referred to as being "connected", "combined" or "linked" to another element, it may include an indirect connection relation that yet another element presents therebetween as well as a direct connection relation. In addition, when an element is referred to as "including" or "having" another element, it means that another element may be additionally included without excluding another element unless otherwise specified.

In the present disclosure, a term such as first, second, etc. is used only to distinguish one element from other element and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

In the present disclosure, elements which are distinguished each other are to clearly describe each characteristic and do not mean that elements must be separated. In other words, a plurality of elements may be combined and configured in a unit of one hardware or software and one element may be distributed and configured in a unit of a plurality of hardware or software. Accordingly, even if separately mentioned, such a combined or distributed embodiment is also included in a scope of the present disclosure.

In the present disclosure, elements described in a variety of embodiments do not necessarily mean essential elements and some may be a selective element. Accordingly, an embodiment configured with a subset of elements described in an embodiment is also included in a scope of the present disclosure. In addition, an embodiment which additionally includes other element in elements described in a variety of embodiments is also included in a scope of the present disclosure.

The present disclosure is about a communication between network nodes in a wireless communication system. A network node may include at least one of a base station, a terminal or a relay. A term of a base station (BS) may be substituted with a term such as a fixed station, a Node B, an eNodeB (eNB), a ng-eNB, a gNodeB (gNB), an Access Point (AP), etc. A terminal may be substituted with a term such as UE (User Equipment), a MS (Mobile Station), a MSS (Mobile Subscriber Station), a SS (Subscriber Station), a non-AP station (non-AP STA), etc.

A wireless communication system may support a communication between a base station and a terminal and may support a communication between terminals. In a communication between a base station and a terminal, a downlink (DL) means a communication from a base station to a terminal. An uplink (UL) means a communication from a terminal to a base station. A communication between terminals may include a variety of communication methods or services such as D2D (Device-to-Device), V2X (Vehicle-to-everything), ProSe (Proximity Service), a sidelink communication, etc. In a communication between terminals, a terminal may be implemented in a form of a sensor node, a vehicle, a disaster alarm, etc.

In addition, examples of the present disclosure may be applied to a wireless communication system including a relay or a relay node (RN). When a relay is applied to a communication between a base station and a terminal, a relay may function as a base station for a terminal and a relay may function as a terminal for a base station. Meanwhile, when a relay is applied to a communication between terminals, a relay may function as a base station for each terminal.

The present disclosure may be applied to a variety of multi access methods of a wireless communication system. For example, a multi access method may include CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, NOMA (Non-Orthogonal Multiple Access), etc. In addition, a wireless communication system to which the present disclosure may be applied may support a TDD (Time Division Duplex) method which uses a time resource that uplink and downlink communications are distinguished each other or may support a FDD (Frequency Division Duplex) method which uses frequency resources which are distinguished each other.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a method for distributed control of base station power according to the present disclosure is described.

In the present disclosure, controlling power of a base station in a distributed type includes determining a power state of each base station by exchanging a message between base stations without intervention of a central processing node. In addition, controlling power of a base station in a distributed type may further include dynamically controlling which base station serves which terminal (i.e., a transmission and reception relation between a base station and a terminal). As power of a base station is controlled in a distributed type, a power state of each base station may be dynamically changed according to a time, a place and an environment and based on it, a transmission and reception relation between a base station and a terminal may be also dynamically controlled or determined. Accordingly, a data rate of a whole network may be maximized while reducing energy consumption (i.e., improving energy efficiency). In other words, according to a method for distributed control of base station power in the present disclosure, while maximizing total network energy efficiency, computational complexity for power control of each base station may be reduced and communication quality for a terminal may be improved.

Figure 1:
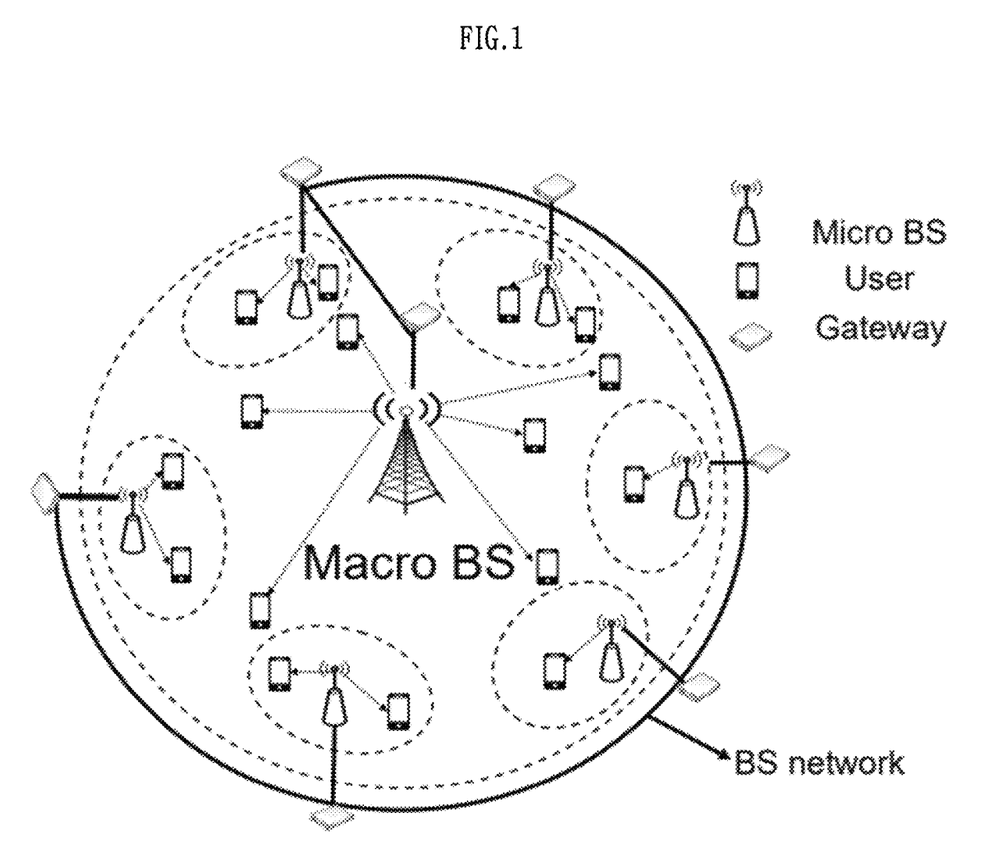
FIG. 1 is a diagram which shows an example of a wireless communication system to which the present disclosure may be applied.

FIG. 1 is a diagram which shows an example of a wireless communication system to which the present disclosure may be applied.

An example of FIG. 1 assumes a heterogeneous network where a macro base station and a micro base station are mixed, but a scope of the present disclosure is not limited thereto and the present disclosure may be also applied to a network where a different RAT (Radio Access Technology) is mixed or a network where equivalent base stations exist.

It is assumed that B base stations (BS) are shown in FIG. 1 and that one macro base station (macro BS) and B-1 micro base stations (micro BS) are arranged at the center of a cell. It is assumed that the number of users or terminals is N. It is expressed as a set of base stations, $I=\{1, 2, \ldots, B\}$, and it is assumed that an index of a macro base station, i, is 1 and that an index of a micro base station, i, is $2, 3, \ldots, B$. It is expressed as a set of terminals, $A=\{1, 2, \ldots, N\}$, and a terminal index is expressed as a. In addition, it is assumed that one base station serves up to $M_i$ terminals.

For clarity, it is assumed that the same transmission power is allocated to transmission and reception between each terminal and each base station and that each base station and each terminal have one antenna, but a case in which different transmission power is allocated or they have a plurality of antennas is not excluded.

It is assumed that one base station is connected to an adjacent base station and a backhaul link. An example of FIG. 1 represents that base stations are connected by a gateway to configure a base station network (BS network). For example, a backhaul link may include a reliable wire link such as a X2 interface in a 3GPP LTE/NR system, but it is not limited thereto and it includes any connection method which may exchange a message between base stations at high speed without an error. In addition, an example of FIG. 1 shows a connection relation in a single branch tree form, but it is not limited thereto, and a base station network includes any connection structure or network topology which forms a tree shape.

Based on such an assumption, when a signal is transmitted from an i-th base station to an a-th terminal, $y_{ia}$, a reception signal of a terminal, is expressed as in Equation 1.

$$y_{ia} = \sqrt{P_i} d_{ia}^{-\lambda} h_{ia} s_{ia} + \sum_{j \in \bar{I}i} \sqrt{P_j} d_{ja}^{-\lambda} h_{ja} s_{ja} + n_{ia} \quad \text{[Equation 1]}$$

In Equation 1, $d_{ia}$ represents a distance from an i-th base station to an a-th terminal, $h_{ia}$ represents a small fading channel coefficient from an i-th base station to an a-th terminal, $P_i$ represents transmission power of an i-th base station, $\lambda$ represents a pathloss index, $s_{ia}$ represents a signal component transmitted from an i-th base station to an a-th terminal and $n_{ia}$ represents a noise component of a channel from an i-th base station to an a-th terminal. In other words, in Equation 1, a signal received by a terminal a may be expressed as a sum of a signal component transmitted by a base station i, a signal component from other base station except for a base station i and a noise.

Energy efficiency is defined as a value which divides a data rate of a whole network by total energy consumption.

First, a data rate ($R_{ia}$) from an i-th base station to an a-th terminal may be expressed as in Equation 2.

$$R_{ia} = \log\left(1 + \frac{P_i d_{ia}^{-2\lambda} |h_{ia}|^2 u_i}{\sigma^2 + \sum_{j \in \bar{I}i} P_j d_{ja}^{-2\lambda} |h_{ja}|^2 u_j}\right) \quad \text{[Equation 2]}$$

In Equation 2, $u_j$ represents a power state of a j-th base station and may have a value of 1 or 0 (i.e., 1 corresponds to a state that a base station is turned on and 0 corresponds to a state that a base station is turned off). $\sigma^2$ represents noise variance.

Accordingly, a full data rate of a network is expressed as in Equation 3.

$$R(\{x_{ia}\}) = \sum_{i \in I} \left(\frac{\sum_{a \in A} R_{ia} x_{ia}}{\sum_{b \in A} x_{ib}}\right) \quad \text{[Equation 3]}$$

In Equation 3, $x_{ia}$ represents whether transmission is performed from an i-th base station to an a-th terminal and may have a value of 1 or 0 (i.e., 1 corresponds to a state that a signal is transmitted and 0 corresponds to a state that a signal is not transmitted).

An example of the present disclosure assumes FDD (Frequency Division Multiplexing) as a multiplexing method when one base station transmits a signal to a plurality of terminals. For example, it is assumed that a different frequency resource is allocated to a different terminal and a frequency resource in an equivalent size is allocated to each terminal. Accordingly, in Equation 3, a data rate for an a-th terminal is divided by $\Sigma_{b \in A} x_{ib}$, the number of terminals served by an i-th base station. An assumption on the above-described multiplexing method is just an example for clarity of a description, and the present disclosure may be applied even when a variety of multiplexing methods such as TDD (Time Division Multiplexing), etc. or non-equivalent resource allocation is performed.

Next, total energy consumption may include transmission power and operating power of a base station. When a base station is turned off (i.e., $u_i=0$), it is assumed that transmission power and operating power of a corresponding base station is 0. Accordingly, total energy consumption may be expressed as in Equation 4.

$$P_{all}(v,u_1) = (v-u_1)(P_T^m + P_O^m) + u_1(P_T^M + P_O^M) \quad \text{[Equation 4]}$$

In Equation 4, v represents the number of base stations in a turn-on state and $u_1$ corresponds to a power state of a macro base station that i is 1. $P_T$ represents transmission power of a base station and $P_O$ represents operating power of a base station. In addition, there is a difference between power consumption of a macro base station and a micro base station, so power consumption of a macro base station is marked as a superscript M and power consumption of a micro base station is marked as a superscript m.

As described above, energy efficiency is defined as a value which divides a whole network data rate by total energy consumption. Here, the existing whole network energy efficiency is defined by a method which simply adds up energy efficiency of each base station, but there is a disadvantage that energy efficiency in terms of a whole network is reduced. Accordingly, in examples of the present disclosure, power of a base station is distributively controlled, so a problem of maximizing energy efficiency is defined in terms of total consumption energy as in Equation 5.

$$\max_{x_{ia} \in \{0,1\}^{B \times N}} \frac{\sum_{i \in I} \frac{\sum_{a \in A} R_{ia} x_{ia}}{\sum_{b \in A} x_{ib}}}{P_{all}(v, u_1)} \quad \text{[Equation 5]}$$

$$\text{subject to } \sum_{i \in I} x_{ia} = 1 \forall a,$$

$$\sum_{a \in A} x_{ia} \le M_i \forall i,$$

$$u_i = \max_{a \in A} x_{ia} \forall i,$$

$$v = \sum_{i=1}^{B} u_i,$$

Through a problem of Equation 5, $x_{ia}$ (i.e., whether transmission is performed from an i-th base station to an a-th terminal, or a relation state between a terminal a and a base station i for downlink transmission) and $u_i$ (i.e., a turn-on/turn-off state of an i-th base station) variables may be optimized to maximize energy efficiency of a whole network.

In Equation 5, a constraint function is that a terminal a receives only a signal from one base station, an i-th base station transmits a signal (or $M_i$ downlink streams) to up to $M_i$ terminals at a time and it is assumed that a base station is in a turn-off state when the base station does not transmit a signal to any terminal.

As an original problem of Equation 5 corresponds to a NP hard (non-deterministic polynomial-time hard) problem, it may be approximated to an unconstrained problem to solve an optimization problem.

In addition, in embodiments of the present disclosure, based on a belief propagation method or a message recognition algorithm, a determination on a power state of a base station and a determination on a transmission and reception relation of a terminal may be distributively optimized by using an algorithm with low complexity for a problem which is hard to solve.

To distributively solve the above-described original problem by using a message recognition algorithm, it may be re-formed as an unconstrained problem. To effectively solve a problem, a graphic modeling approach method may be applied with an optimization method based on a message recognition algorithm. To this end, a predetermined factor function is defined to process an objective function (or a target function) and a constraint function.

First, to satisfy a constraint function that a terminal a should receive a signal from only one base station, a first factor function $F_a$ as in Equation 6 may be defined.

$$F_a(\{x_{ia}\}) = \begin{cases} -\infty & \text{if } \sum_{i \in I} x_{ia} \ne 1, \\ 0 & \text{otherwise} \end{cases} \quad \text{[Equation 6]}$$

Next, to satisfy a constraint function that a base station serves up to Mi terminals, a second factor function $G_i$ as in Equation 7 may be defined.

$$G_i(\{x_{ia}\}, u_i) = \begin{cases} -\infty & \text{if } \sum_{a \in A} x_{ia} > M_i \\ & \text{or } u_i \ne \max_{a \in A} x_{ia}, \\ 0 & \text{if } \sum_{a \in A} x_{ia} = 0, \\ \frac{\sum_{a \in A} R_{ia} x_{ia}}{P_{all}(v, u_1) \sum_{b \in A} x_{ib}} & \text{otherwise} \end{cases} \quad \text{[Equation 7]}$$

Meanwhile, a constraint condition which determines a power state of a base station requires a lot of element functions for distributed processing. To make an overall distributed process possible, a separate base station may recognize and estimate a value of v in cooperation with other base stations by considering a global parameter v corresponding to the number of base stations in a turn-on state in a whole network.

To this end, a variable of $u_i$ (i.e., a turn-on/turn-off state of an i-th base station) may be partitioned into two variables by considering a message propagation process. For example, $u_i$ may be expressed as a sum of $z_{i1}$ and $z_{i2}$. In other words, $z_{i1}$ corresponds to the number of base stations in a turn-on state among base stations (i.e., base stations of a $\{1, 2, \ldots, i\}$ index) from a first base station (or a macro base station that i is 1) to a base station i. In addition, $z_{i2}$ corresponds to the number of base stations in a turn-on state among base stations (i.e., base stations of a $\{i+1, i+2, \ldots, B\}$ index) from a last base station (or a micro base station that i is B) to a base station i+1. When it is expressed by an Equation, it is as follows.

$$v = z_{i1} + z_{i2} = \sum_{k=1}^{B} u_k, \quad \text{[Equation 8]}$$

$$z_{i1} = \sum_{k=1}^{i} u_k,$$

$$z_{i2} = \sum_{k=i+1}^{B} u_k$$

In Equation 8, $z_{01}=0$ and $z_{B2}=u_B$ should be satisfied, so a third factor function $H_i$ therefor may be defined as in Equation 9. In other words, $H_i$ corresponds to the number of base stations in a turn-on state estimated by forward and backward message passing.

$$H_i(z_{i1}, z_{i2}, \hat{v}) = \begin{cases} -\infty & \text{if } v_i \ne z_{i1} + z_{i2} \\ 0 & \text{otherwise} \end{cases} \quad \text{[Equation 9]}$$

In addition, $z_{i1}$, the number of base stations in a turn-on state until an i-th base station in a forward direction, corresponds to a sum of the number of base stations in a turn-on state until an i-th base station in a forward direction and a turn-on state value of an i-th base station, which may be expressed as $z_{i1}=z_{i-1,1}+u_i$ (or $z_{i1}=z_{i-1,1}+u_i$). In addition, $z_{i-1,2}$, the number of base stations in a turn-on state until an i-th base station in a backward direction, corresponds to a sum of the number of base stations in a turn-on state until a i+1-th base station in a backward direction and a turn-on state value of an i-th base station, which may be expressed as $z_{i-1,2}=z_{i2}+u_i$ (or $z_{i-1,2}=z_{i2}+u_i$).

To satisfy such a relation, a fourth factor function $H_{i1}$ and a fifth factor function $H_{i2}$ may be defined as in Equation 10. In other words, $H_{i1}$ corresponds to the number of base stations in a turn-on state estimated by forward message passing and $H_{i2}$ corresponds to the number of base stations in a turn-on state estimated by backward message passing.

$$H_{i1}(z_{i1}, z_{i-1,1}, u_i) = \begin{cases} -\infty & \text{if } z_{i1} \neq z_{i-1,1} + u_i, \\ 0 & \text{otherwise} \end{cases}$$ [Equation 10]

$$H_{i2}(z_{i2}, z_{i-1,2}, u_i) = \begin{cases} -\infty & \text{if } z_{i-1,2} \neq z_{i2} + u_i, \\ 0 & \text{otherwise} \end{cases}.$$

A constrained original problem in Equation 5, based on the above-described five factor functions $F_a$, $G_i$, $H_i$, $H_{i1}$, and $H_{i2}$, may be approximated or modified into an unconstrained problem. A modified problem may be expressed as in Equation 11.

$$\max_{\{x_{ia}\},\{z_{i1},z_{i2}\},\{u_i\}} \sum_{i \in I} (G_i(\{x_{ia}\}, u_i) + H_{i1}(z_{i1}, z_{i-1,1}, u_i) +$$ [Equation 11]

$$H_{i2}(z_{i2}, z_{i-1,2}, u_i) + H_i(z_{i1}, z_{i2}, u_i)) + \sum_{a \in A} F_a(\{x_{ia}\}).$$

An unconstrained problem as in Equation 11 is very suitable to be distributive resolved and has an advantage to get the optimum resolution in a factor graph. A visual expression of a factor graph is important in that it is related to an actual arrangement of a distributed algorithm.

Figure 2:
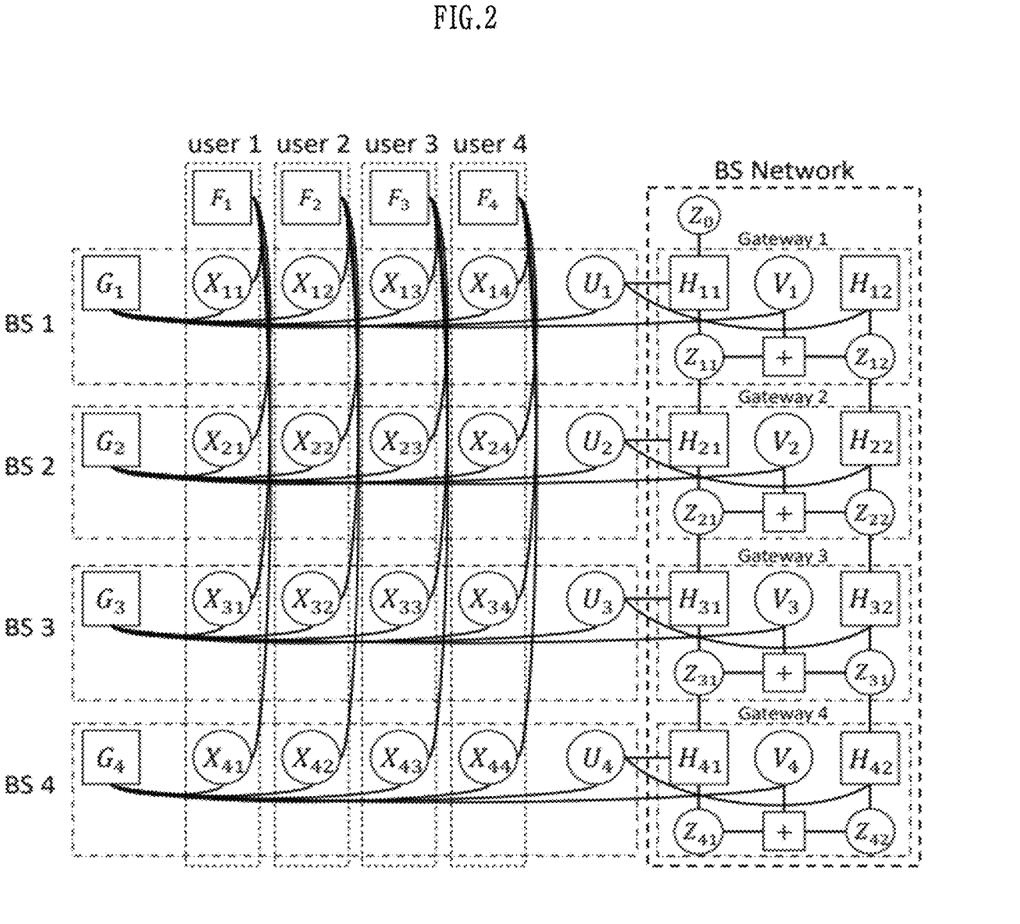
FIG. 2 is a diagram which represents an example of a factor graph to which the present disclosure may be applied.

FIG. 2 is a diagram which represents an example of a factor graph to which the present disclosure may be applied.

Figure 3:
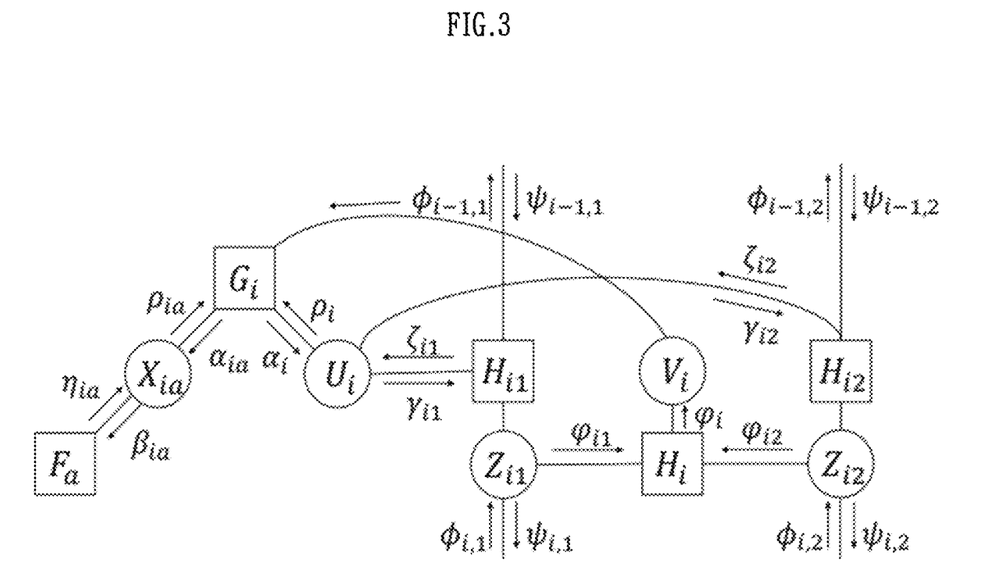
FIG. 3 is a diagram which represents an example of a message definition and relation to which the present disclosure may be applied.

FIG. 3 is a diagram which represents an example of a message definition and relation to which the present disclosure may be applied.

In FIGS. 2 and 3, a square node corresponds to a factor function related to a constraint condition and a circle node corresponds to a determined variable (i.e., a variable node).

A message may be deducted by using a max-sum-based computational rule which defines a subset with the maximum sum of consecutive factors. FIG. 2 illustrates a factor graph which considers a situation that there are 4 terminals (i.e., user1, user2, user3, and user4) and 4 base stations (i.e., BS1, BS2, BS3, BS4).

A message update rule is suggested according to derivation of a message passing algorithm. In a variable node, an outgoing message is updated by using a sum of all incoming messages. When there is only one incoming message in any variable node, input of a corresponding variable node becomes output of a variable node as it is. Alternatively, when there are two incoming messages in any variable node, a sum of messages input in a corresponding variable node becomes output of a variable node. Accordingly, a relation as in Equation 12 is deducted from a graph model in FIG. 3.

$$\beta_{ia} = \alpha_{ia}, \rho_{ia} = \eta_{ia}$$

$$\rho_i = \zeta_{i1} + \zeta_{i2}, \gamma_{ik} = \alpha_i, k \in \{1,2\}$$ [Equation 12]

In addition, in FIG. 3, a message propagated between nodes is defined as follows.

$$\beta_{ia} = \mu_{x_{ia}} \to F_a(x_{ia}=1) - \mu_{x_{ia}} \to F_a(x_{ia}=0),$$

$$\eta_{ia} = \mu_{F_a} \to x_{ia}(x_{ia}=1) - \mu_{F_a} \to x_{ia}(x_{ia}=0),$$

$$\rho_{ia} = \mu_{x_{ia}} \to G_i(x_{ia}=1) - \mu_{x_{ia}} \to G_i(x_{ia}=0),$$

$$\alpha_{ia} = \mu_{G_i} \to x_{ia}(x_{ia}=1) - \mu_{G_i} \to x_{ia}(x_{ia}=0).$$

$$\rho_i = \mu_{u_i} \to G_i(u_i=1) - \mu_{u_i} \to G_i(u_i=0),$$

$$\alpha_i = \mu_{G_i} \to u_i(u_i=1) - \mu_{G_i} \to u_i(u_i=0).$$

$$\gamma_{ik} = \mu_{u_i} \to H_{ik}(u_i=1) - \mu_{u_i} \to H_{ik}(u_i=0),$$

$$\zeta_{ik} = \mu_{H_{ik}} \to u\_i(u_i=1) - \mu_{H_{ik}} \to u_i(u_i=0).$$ [Equation 13]

In Equation 13, for a variable $\chi$, a message passed from an origin node $\kappa$ to a destination node $\tau$ is expressed as $\mu_{\kappa \to \tau}$ ($\chi = \chi_0$). In other words, each message may be expressed in a way that an origin node informs a destination node of how much it wants a value of a variable $\chi$ to be $\chi 0$ in terms of optimization.

For example, $\alpha_{ia}$, based on a $G_i$ factor function (i.e., an i-th base station serves a terminal equal to or less than $M_i$), represents a degree or a probability that an i-th base station serves an a-th terminal (i.e., a difference between a case in which an i-th base station transmits a signal to an a-th terminal ($x_{ia}=1$) and a case in which an i-th base station does not transmit a signal to an a-th terminal ($x_{ia}=0$)). In addition, $\eta_{ia}$, based on a $F_a$ factor function (i.e., an a-th terminal is served only by one base station), represents a degree or a probability that an i-th base station serves an a-th terminal. In addition, $\alpha_i$, based on a Gi factor function, represents a degree or a probability that an i-th base station is turned on. Other messages may be understood in a way similar to the examples.

Next, a message update rule for a message passed from a factor function node to a variable node is described. Maximization of a message on a sum of factor functions and a sum of reception is included in a message update rule based on a max-sum message update rule. For example, a message update formula on $\eta_{ia}$ may be expressed as follows.

$$\eta_{ia} = -\max_{j \in I \setminus i} \beta_{ja}$$ [Equation 14]

In Equation 14, for $\eta_{ia} < 0$, it means that an a-th terminal may receive a signal from other base station except for an i-th base station. In other words, $\eta_{ia}$ corresponds to a message for satisfying a limitation that an a-th terminal is served only by 1 base station. A $\eta_{ia}$ message slightly depends on power consumption of a network and consideration for such power consumption is helpful for performance improvement. As total power consumption is different according to a power state of a macro base station and the number of base stations in a turn-on state, a message should be updated by considering both a case in which a macro base station is in a turn-on state and a case in which a macro base station is in a turn-off state. Accordingly, a value of $\alpha_{ia}$ may be defined as follows.

[Equation 15]

$$\alpha_{ia} = \mu_{G_i \to x_{ia}}(x_{ia} = 1) - \mu_{G_i \to x_{ia}}(x_{ia} = 0) =$$

$$\max_{u1} \max_{Xi \setminus x_{ia}} \left( G_i(x_{ia} = 1, Xi \setminus x_{ia}, u_1) + \sum_{b \in A \setminus a} \mu_{x_{ib} \to G_i}(x_{ib}) + \mu_{u_1 \to G_i}(u1) \right) - \max_{u1} \max_{Xi \setminus x_{ia}}$$

-continued $$\left(G_i(x_{ia}=0, X\hat{i}\backslash x_{ia}, u_1) + \sum_{b\in A\backslash a}\mu_{x_{ib}\to G_i}(x_{ib}) + \mu_{u_1\to G_i}(u1)\right) =$$

$$\max_{u1}\max\left(\frac{R_{ia}}{P(v,u_1)}, \frac{R_{ia}}{2P(v,u_1)} + \overline{\max}_{b\in A\backslash a}\left(1, \frac{R_{ib}}{2P(v,u_1)} + \rho_{ib}\right),\right.$$

$$\left.\ldots, \frac{R_{ia}}{M_iP(v,u_1)} + \sum_{l=1}^{M_i-1}\overline{\max}_{b\in A\backslash a}\left(l, \frac{R_{ib}}{M_iP(v,u_1)} + \rho_{ib}\right)\right) - \max_{u_1}\max$$

$$\left(-\rho_i, \overline{\max}_{b\in A\backslash a}\left(1, \frac{R_{ib}}{P(v,u_1)} + \rho_{ib}\right), \sum_{l=1}^{2}\overline{\max}_{b\in A\backslash a}\left(l, \frac{R_{ib}}{2P(v,u_1)} + \rho_{ib}\right),\right.$$

$$\left.\ldots, \sum_{l=1}^{M_i}\overline{\max}_{b\in A\backslash a}\left(l, \frac{R_{ib}}{M_iP(v,u_1)} + \rho_{ib}\right)\right)$$

As in Equation 15, $\alpha_{ia}$ is defined as a message which represents a degree of whether an i-th base station will serve an a-th terminal. By summarizing Equation 15, it may be expressed as in Equation 16.

$$\alpha_{ia} = \max(A_{ia}(1, P(v,1)), A_{ia}(1, P(v,0))) - \qquad\text{[Equation 16]}$$

$$\max(A_{ia}(0, P(v,0)), A_{ia}(0, P(v,0))),$$

$$A_{ia}(x_{ia}, p) = \max\left[\left(\frac{R_{ia}}{p} + \rho_i\right)x_{ia} - \rho_i,\right.$$

$$\frac{R_{ia}}{(x_{ia}+1)p} + \overline{\max}_{b\in A\backslash a}\left(1, \frac{R_{ib}}{(x_{ia}+1)p} + \rho_{ib}\right),$$

$$\frac{R_{ib}}{(x_{ia}+2)p} + \sum_{l=1}^{2}\overline{\max}_{b\in A\backslash a}\left(l, \frac{R_{ib}}{(x_{ia}+2)p} + \rho_{ib}\right),$$

$$\left.\ldots, \frac{R_{ia}}{M_ip} + \sum_{l=1}^{M_i-x_{ia}}\overline{\max}_{b\in A\backslash a}\left(l, \frac{R_{ib}}{M_ip} + \rho_{ib}\right)\right]$$

In Equation 16, $$\overline{\max}_{s\in S}(l, \theta_s)$$

represents the l-th largest input among messages of $\theta_s$. $A_{ia}(x_{ia}, p)$ is a function having $x_{ia}$, a binary state, and p, power consumption, as input. A message passed through an interface between base station network and terminal connections is as follows.

$$\rho_i = \zeta_{i1} + \zeta_{i2}, \gamma_{ik} = \alpha_i, k\in\{1,2\} \qquad\text{[Equation 17]}$$

In Equation 17, it is defined that $\gamma_{ik}$ is $\alpha_i + \zeta_{i,3-k}$. In this case, $\gamma_{ik}$ is an estimated value for a turn-on/off state of an i-th base station, so it may be considered to depend on more $\alpha_i$ than $\zeta_{i,3-k}$. Therefore, a value of $\zeta_{i,3-k}$ may be ignored. Based on the above-described max-sum method, $\alpha_i$ may be expressed as follows.

$$\alpha_i = \mu_{G_i\to u_i}(u_i=1) - \mu_{G_i\to u_i}(u_i=0) \qquad\text{[Equation 18]}$$

$$= \max_{\chi i}\left(G_i(\chi_i, u_i=1) + \sum_{a\in A}\mu_{x_{ia}\to G_i}(x_{ia})\right)$$

$$- \max_{\chi i}\left(G_i(\chi_i u_i=0) + \sum_{a\in A}\mu_{x_{ia}\to G_i}(x_{ia})\right)$$

$$= \max_{u_1}\max\left(\overline{\max}_{a\in A}\left(1, \frac{R_{ia}}{P(v,u_1)} + \rho_{ia}\right),\right.$$

$$\sum_{l=1}^{2}\overline{\max}_{a\in A}\left(l, \frac{R_{ia}}{2P(v,u_1)} + \rho_{ia}\right), \ldots,$$

$$\left.\sum_{l=1}^{M_i}\overline{\max}_{a\in A}\left(l, \frac{R_{ia}}{M_iP(v,u_1)} + \rho_{ia}\right)\right)$$

As in Equation 18, $\alpha_i$ is defined as a message which represents likability on whether a power state of an i-th base station is in a turn-off (or sleep) state or turn-on (or operational) state. By summarizing Equation 18, it may be expressed as in Equation 19.

$$\alpha_{ia} = \max(A_i(P(v,1)), A_i(P(v,0))) \qquad\text{[Equation 19]}$$

$$A_i(p) = \max\left(\overline{\max}_{b\in A\backslash a}\left(1, \frac{R_{ia}}{p} + \rho_{ia}\right), \sum_{l=1}^{2}\overline{\max}_{a\in A}\left(l, \frac{R_{ia}}{2p} + \rho_{ia}\right), \ldots,\right.$$

$$\left.\sum_{l=1}^{M_i}\overline{\max}_{a\in A}\left(l, \frac{R_{ia}}{M_ip} + \rho_{ia}\right)\right),$$

In other words, $\alpha_i$ is a value which represents a degree that a power state of each base station is in a turn-on state. A power state of a base station with the largest value of $\alpha_i$ among all base stations is kept in a turn-on state. $\alpha_i$ is copied to a $\gamma_{i1}$ and $\gamma_{i2}$ message and transmitted to a base station network for safety of base station operation.

Next, a method in which the number of base stations in a turn-on state is calculated and which base station will be in a turn-on state is determined is described.

A base station network may calculate the total number of base stations in a turn-on state in a general network to achieve the best energy efficiency network configuration and may include 2 lattice structures extended in 2 opposite directions (i.e., forward and backward) with a goal of determining a power state of each base station.

To this end, each base station exchanges two types of messages with a base station adjacent in 2 directions. Accordingly, message calculation for a base station network may be considered as a forward algorithm such as a BCJR algorithm. A base station passes a $\psi_{i1}$ and $\psi_{i2}$ message in a forward direction and passes a $\varphi_{i1}$ and $\varphi_{i2}$ message in a backward direction.

In addition, as described above, a relation between adjacent base stations may be expressed as $z_{i1}=z_{i-1,1}+u_i$ (or $z_{i1}=z_{i-1,1}+u_i$) and $z_{i-1,2}=z_{i2}+u_i$ (or $z_{i-1,2}=z_{i2}+u_i$). Accordingly, $\psi_{i1}$, $\psi_{i2}$, $\varphi_{i1}$, and $\varphi_{i2}$ may be expressed as follows.

$$\psi_{i1}(z)=\max(\psi_{i-1,1}(z),\psi_{i-1,1}(z-1)+\gamma_{i1})$$

$$\varphi_{i1}(z)=\max(\varphi_{i+1,1}(z),\varphi_{i+1,1}(z+1)+\gamma_{i+1,1})$$

$$\psi_{i2}(z)=\max(\psi_{i-1,2}(z),\psi_{i-1,2}(z+1)+\gamma_{i-1,2})$$

$$\varphi_{i2}(z)=\max(\varphi_{i+1,2}(z),\varphi_{i+1,2}(z-1)+\gamma_{i2}) \qquad\text{[Equation 20]}$$

In Equation 20, $\psi_{i1}$ and $\varphi_{i2}$ correspond to a state change message according to an increase in the number of base stations in a turn-on state or activated base stations and $\varphi_{i1}$ and $\psi_{i2}$ correspond to a state change message according to a decrease in the number of base stations in a turn-on state or activated base stations.

In addition, $\varphi_{i1}$ and $\varphi_{i2}$, a message for calculating the number of base stations in a turn-on state or activated base stations, are expressed as follows.

$$\varphi_{i1}(z) = \max(\phi_{i+1,1}(z), \phi_{i+1,1}(z+1) + \gamma_{i+1,1}),$$

$$\varphi_{i2}(z) = \max(\phi_{i+1,2}(z), \phi_{i+1,2}(z-1) + \gamma_{i2}), \quad \text{[Equation 21]}$$

Accordingly, in a whole network, the number of base stations in a turn-on state may be estimated as follows.

$$\hat{v} = \arg\max_{1 \le v \le B} \max_{1 \le z \le v} (\varphi_{i1}(z) + \varphi_{i2}(v - z)), \quad \text{[Equation 22]}$$

In addition, $\zeta_{i1}$ and $\zeta_{i2}$ may be calculated as follows.

$$\zeta_{i1} = \max_z(\phi_{i1}(z+1) + \psi_{i-1,1}(z)) - \max_z(\phi_{i1}(z) + \psi_{i-1,1}(z)), \quad \text{[Equation 23]}$$

$$\zeta_{i2} = \max_z(\phi_{i2}(z) + \psi_{i-1,2}(z+1)) - \max_z(\phi_{i2}(z) + \psi_{i-1,2}(z)).$$

$$\rho_i = \zeta_{i1} + \zeta_{i2}$$

In Equation 23, $\zeta_{i1}$ and $\zeta_{i2}$ are a message which represents a determination on whether to be turned off (or sleep) or turned on (or operational) for the optimal resolution for an i-th base station. In addition, a turn-on/off state of an i-th base station may be determined based on a message $\rho_i$.

In addition, to strengthen the characteristics of optimization, a message initial value of a lattice structure may be applied as follows.

$$\psi_{B1}(z), \phi_{B1}(z) = \begin{cases} -\infty & \text{if } z \ne v \\ 0 & \text{otherwise} \end{cases}, \quad \text{[Equation 24]}$$

$$\psi_{12}(z), \phi_{12}(z) = \begin{cases} -\infty & \text{if } z \ne v \\ 0 & \text{otherwise} \end{cases}.$$

Equation 24 means that when forward message propagation is considered, $z_{B1}$ should be v in a B-th base station and that when backward message propagation is considered, $z_{12}$ should be v in a first base station.

Last, whether of terminal allocation and signal transmission for a base station may be determined as follows.

$$\tilde{C}_a^{(t)} = \underset{i \in I}{\operatorname{argmax}}\left(\tilde{\alpha}_{ia}^{(t)} + \tilde{\rho}_{ia}^{(t)}\right) \quad \text{[Equation 25]}$$

In Equation 25, t corresponds to an index of iteration, $\tilde{\alpha}_{ia}^{(t)}$ corresponds to an estimated value of $\alpha_{ia}^{(t)}$ and $\tilde{\rho}_{ia}^{(t)}$ corresponds to an estimated value of $\rho_{ia}^{(t)}$.

A terminal a may determine its own serving base station $C_a^{(t)}$ by using Equation 25.

Specifically, according to an algorithm which manages energy efficiency in a distributive manner described in the present disclosure, as an initial configuration for t=0, it is assumed that for every i and a, $\rho_{ia}^{(t)}$ is 0 and all base stations are in a turn-on state. Subsequently, until a value of t reaches the pre-configured maximum value, $t_{iter}$, or a value of $C_a^{(t)}$ converges, the following processes (1) to (6) are repeated.

(1) A base station i updates an estimated value of $\alpha_{ia}^{(t)}$ for each terminal a and passes it to a terminal a.

(2) A terminal a updates an estimated value of $\rho_{ia}^{(t)}$ for each base station i and performs feedback for a base station i.

(3) All base stations perform forward and backward update.

(4) Each base station calculates a sum of $\zeta_{ik}^{(t)}$ to obtain $\rho_i^{(t)}$ and obtain a calculated value of v.

(5) If a value of $\rho_i^{(t)}$ is a negative number, each base station is turned off to release a terminal.

(6) A value of t is configured as t+1.

Figure 4:
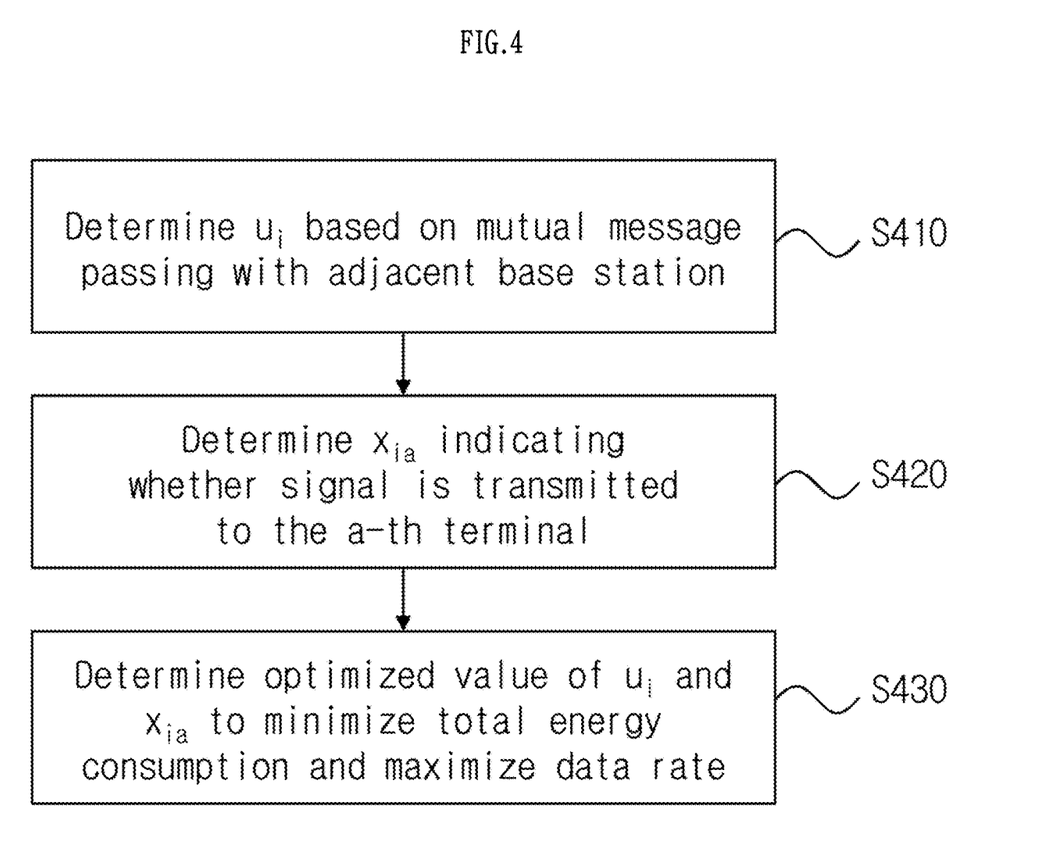
FIG. 4 is a flow chart for describing an operation of a base station apparatus according to the present disclosure.

FIG. 4 is a flow chart for describing an operation of a base station apparatus according to the present disclosure.

A base station operation described in FIG. 4 may be performed in each of B base stations (i.e., i (1=1, 2, . . . , B)-th base station).

In Step S410, a base station may determine $u_i$ (i.e., a turn-on or turn-off state of an i-th base station) based on mutual message passing with an adjacent base station.

In Step S420, a base station may determine $x_{ia}$, whether a signal is transmitted to an a-th terminal.

In Step S430, a base station may obtain an optimized value of $u_i$ and $x_{ia}$ which minimize total energy consumption consumed by B base stations and maximize a data rate of the B base stations at the same time.

In this case, an optimized value of $u_i$ and $x_{ia}$ may be obtained by approximating an original problem configured as in the Equation 5 to an unconstrained problem as in the Equation 11 based on a predetermined factor function and resolving an approximated problem.

Figure 5:
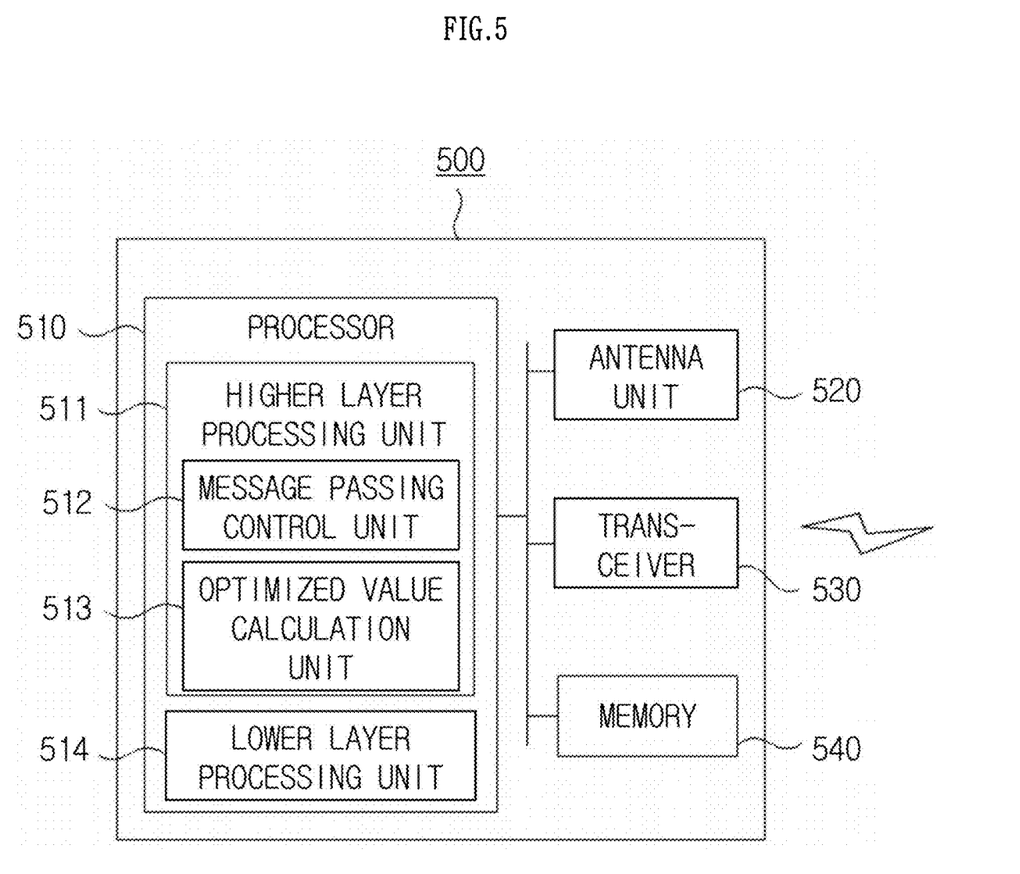
FIG. 5 is a diagram which represents a configuration of a base station apparatus according to the present disclosure.

FIG. 5 is a diagram which represents a configuration of a base station apparatus according to the present disclosure.

A base station apparatus 500 may include a processor 510, an antenna unit 520, a transceiver 530 and a memory 540.

A processor 510 may perform baseband-related signal processing and include a higher layer processing unit 511 and a physical layer processing unit 515. A higher layer processing unit 511 may process an operation of a MAC layer, a RRC layer, or a higher layer or above. A physical layer processing unit 515 may process an operation of a PHY layer (e.g., downlink transmission signal processing, uplink reception signal processing, etc.). A processor 510 may control an operation of a base station apparatus 500 in general, as well as perform baseband-related signal processing.

An antenna unit 520 may include at least one physical antenna and support MIMO transmission and reception when it includes a plurality of antennas. A transceiver 530 may include a RF transmitter and a RF receiver. A memory 540 may store processed information of a processor 510, a software related to an operation of a base station apparatus 500, an operating system, an application, etc. and include elements such as a buffer, etc.

A processor 510 of a base station apparatus 500 may be configured to implement an operation of each of B base stations (i.e., i (i=1, 2, . . . , B)-th base station) in embodiments described in the present disclosure.

For example, a higher layer processing unit 511 of a processor 510 of a base station apparatus 500 may include a message massing control unit 512 and an optimum value calculation unit 513.

A message massing control unit 512 may control a base station apparatus 500 to perform mutual message passing with an adjacent base station. For example, it may calculate a value of various messages based on a message received from an adjacent base station and generate a message which will deliver a result thereof to other adjacent base station.

An optimum value calculation unit 513, based on a value of a message calculated or generated in a message massing control unit 512, may determine $u_i$ (i.e., a turn-on or turn-off state of an i-th base station). In addition, an optimum value calculation unit 513 may determine $x_{ia}$, whether a signal is transmitted to an a-th terminal. In addition, an optimum value calculation unit 513 may obtain an optimized value of $u_i$ and $x_{ia}$ which minimize total energy consumption consumed by B base stations and maximize a data rate of the B base stations at the same time.

To this end, an optimized value of $u_i$ and $x_{ia}$ may be obtained by approximating an original problem configured as in the Equation 5 to an unconstrained problem as in the Equation 11 based on a predetermined factor function and resolving an approximated problem.

A matter described for a base station in examples of the present disclosure may be equally applied to an operation of a base station apparatus 500 and an overlapping description is omitted.

Figure 6:
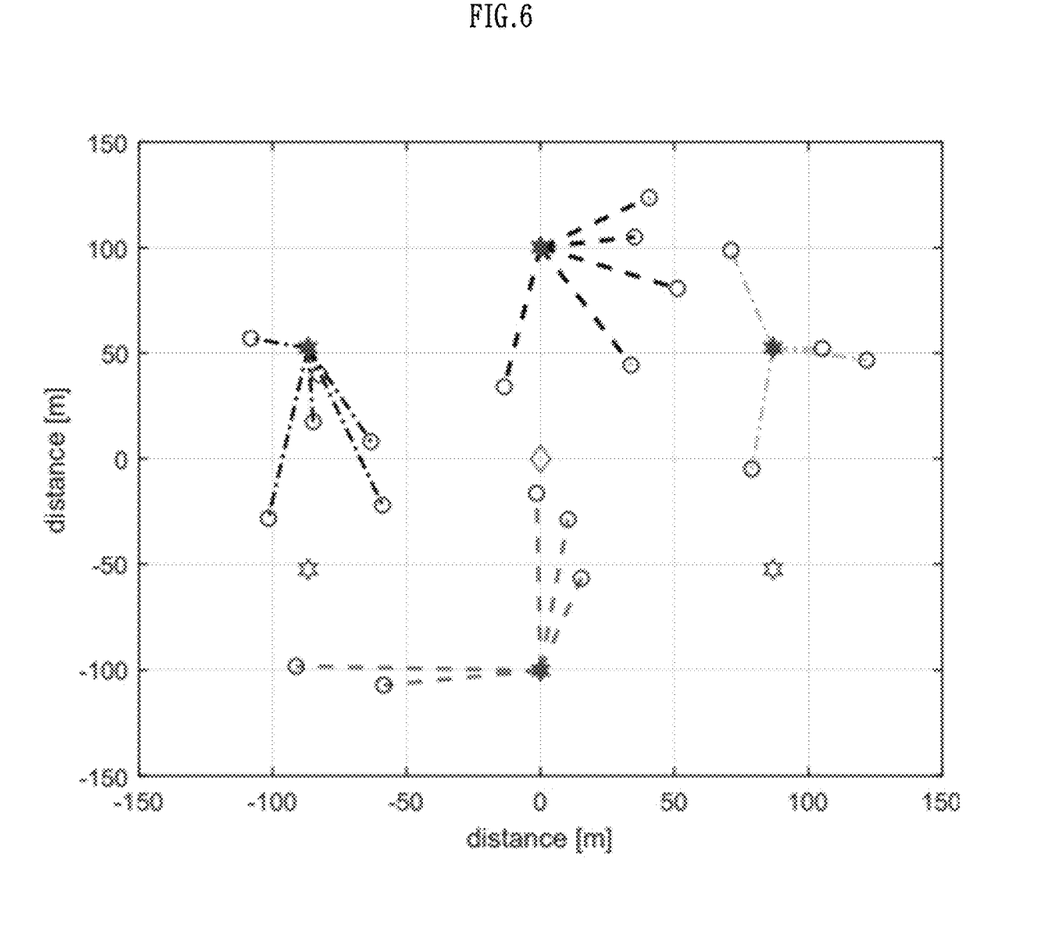
FIGS. 6 to 8 are a diagram which represents a simulation result related to the present disclosure.
Figure 7:
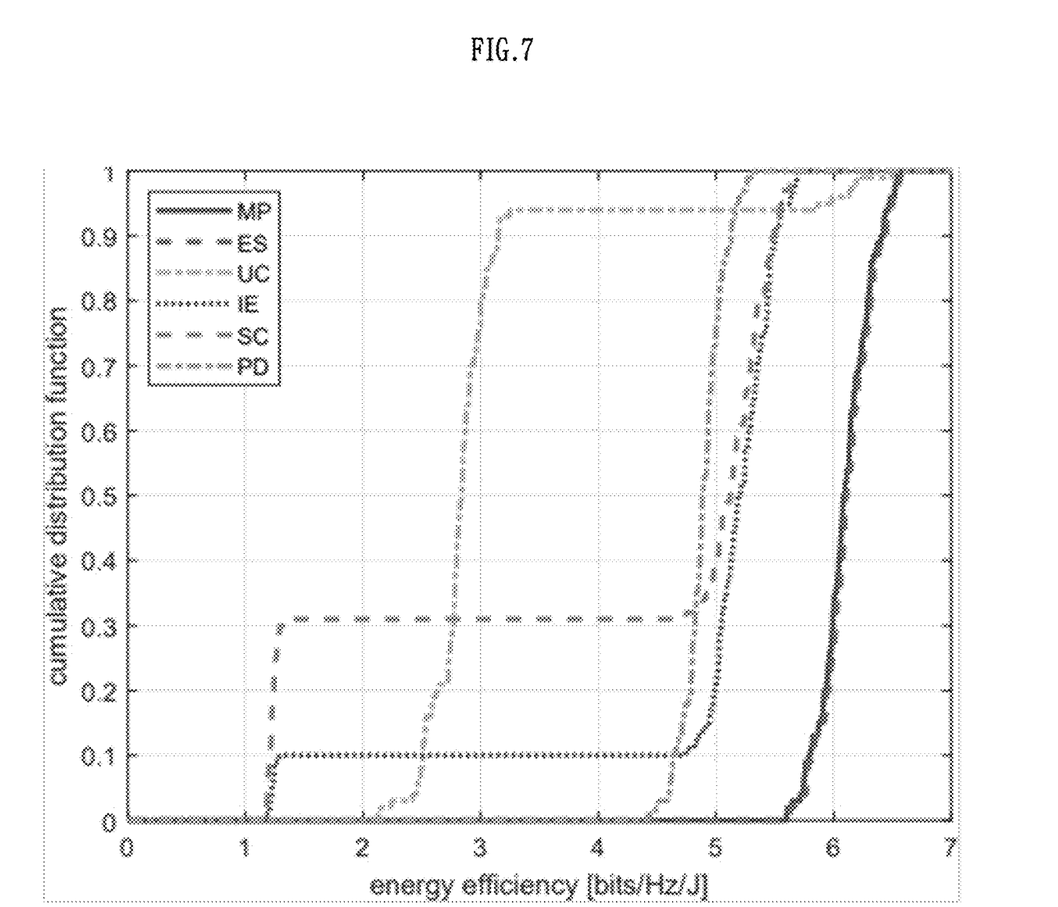
Figure 8:
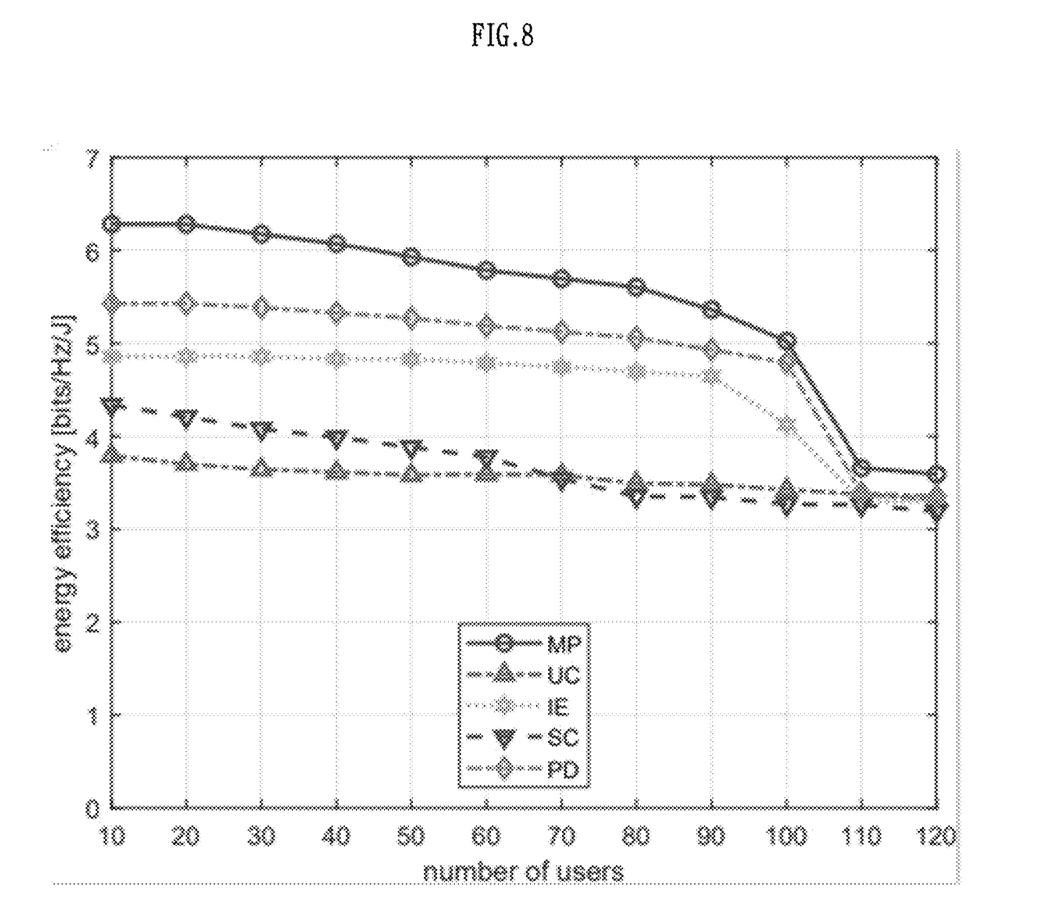

FIGS. 6 to 8 are a diagram which represents a simulation result related to the present disclosure.

FIG. 6 is a graph which represents a power state of a base station and to which terminal it is transmitted by using a message passing algorithm when there are 7 base stations and 20 terminals.

In an example of FIG. 6, a diamond mark represents a macro base station, a solid star mark represents a micro base station in a turn-on state, a blank star mark represents a micro base station in a turn-off state and a circle mark represents a terminal.

FIG. 7 represents a comparison of a cumulative distribution function for energy efficiency according to message passing (MP) algorithms and comparison algorithms (ES, UC, IE, SC, PD) according to the present disclosure when there are 7 base stations and 20 terminals. It may be confirmed that MP achieves the best energy efficiency. ES is an algorithm which represents the best energy efficiency by considering the number of all cases. A SC algorithm is a algorithm which determines where each base station will transmit a terminal based on a sum of channel states. An UC algorithm is an algorithm that a terminal selects a base station based on a channel state and a base station performs transmission. An IE algorithm is an algorithm which maximizes a sum of energy efficiency in each base station. Last, a PD algorithm is an algorithm which is optimized based on a primitive decomposition algorithm.

FIG. 8 represents a change of energy efficiency according to an increase in the number of terminals. It may be confirmed that in any situations, a MP algorithm according to the present disclosure achieves the best energy efficiency.

In an example of FIGS. 6 to 8, it is assumed that a pathloss index $\lambda=4.0$, a maximum transmission power of a macro base station $P_T^M=37.99$ dBm, a maximum transmission power of a micro base station $P_T^m=21.14$ dBm, an operating power of a macro base station $P_o^M=47.53$ dBm, an operating power of a micro base station $P_o^m=38.33$ dBm, a noise power $\sigma^2=-174$ dBm, and a maximum number of supportable terminals of a micro base station is 9.

According to a distributed control method of base station power in a wireless communication system according to the present disclosure, it is possible to construct a communication system that each user uses only local information in a multi-user large-scale antenna system. Contrary to the existing method which determines a base station operation in a central processing node, the present disclosure determines a base station operation while distributively exchanging a message between base stations, so it may reduce a burden of a central processing unit.

In addition, as confirmed in a simulation result, according to the present disclosure, it is possible to get a result of maximizing energy efficiency of a whole network considering a power state of each base station simultaneously while optimizing signal transmission and a connection relation configuration between multiple users and multiple base stations and to achieve high energy efficiency compared with other methods.

The present disclosure has an advantage of reducing total energy consumption and providing a high-quality service to a terminal by exchanging information between base stations both in a situation that the number of terminals is relatively small, e.g., at dawn, or a situation that the number of terminals is large, e.g., at lunchtime.

According to the present disclosure, a base station and a user may perform an algorithm only with local information and achieve good performance with low complexity in a combinatorial problem which is difficult to approach practically because a communication network is large.

Illustrative methods of the present disclosure are expressed as motion series for clarity of a description, but it is not to limit an order that a step is performed and if necessary, each step may be performed simultaneously or in a different order. To implement a method according to the present disclosure, other step may be additionally included in an illustrated step, or remaining steps except for some steps may be included, or an additional other step except for some steps may be included.

A variety of embodiments of the present disclosure do not enumerate all possible combinations, but are to describe a representative aspect of the present disclosure, and matters described in various embodiments may be independently applied or may be applied by at least two combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A scope of the present disclosure includes software or machine-executable commands (e.g., an operating system, an application, a firmware, a program, etc.) which execute an action according to a method of various embodiments in a device or a computer and a non-transitory computer-readable medium that such software or commands, etc. are stored and are executable in a device or a computer.

The invention claimed is:

1. A method of controlling power of a base station in a distributive manner in a wireless communication system comprising:
   determining $u_i$ indicating a turn-on or turn-off state of an i-th base station based on mutual message passing with an adjacent base station in the i-th base station among B base stations;
   determining $x_{ia}$ indicating whether a signal is transmitted to an a-th terminal among N terminals from the i-th base station; and
   obtaining an optimized value of the $u_i$ and the $x_{ia}$ which minimize total energy consumption consumed by the B base stations and simultaneously, maximize a data rate of the B base stations.

2. The method of claim 1, wherein:
the B base stations include one macro base station and B-1 micro base stations,
the turn-on or turn-off state of the one macro base station corresponds to $u_1$.

3. The method of claim 2, wherein:
the optimized value of the $u_i$ and the $x_{ia}$ is determined by resolving an original problem in a following Equation, $$\max_{x_{ia} \in \{0,1\}^{B \times N}} \sum_{i \in I} \frac{\sum_{a \in A} R_{ia} x_{ia}}{\sum_{b \in A} x_{ib}} P_{all}(v, u_1)$$

wherein:
A corresponds to a set of N terminals,
I corresponds to a set of B base stations,
$R_{ia}$ corresponds to a data rate from the i-th base station to the a-th terminal,
$P_{all}(v, u_1)$ corresponds to the total energy consumption determined based on the $u_1$ and v indicating a number of base stations in the turn-on state among the B base stations.

4. The method of claim 3, wherein:
the original problem is approximated to an unconstrained problem based on a predetermined factor function.

5. The method of claim 4, wherein:
the unconstrained problem is defined as in the following Equation, $$\max_{\{x_{ia}\},\{z_{i1},z_{i2}\},\{u_i\}} \sum_{i \in I} (G_i(\{x_{ia}\}, u_i) + H_{i1}(z_{i1}, z_{i-1,1}, u_i) + H_{i2}(z_{i2}, z_{i-1,2}, u_i) + H_i(z_{i1}, z_{i2}, u_i)) + \sum_{a \in A} F_a(\{x_{ia}\})$$

wherein:

$v = z_{i1} + z_{i2} = \sum_{k=1}^{B} u_k, z_{i1} = \sum_{k=1}^{i} u_k, z_{i2} = \sum_{k=i+1}^{B} u_k.$ 6. The method of claim 5, wherein:
a first factor function among the predetermined factor function is defined as in the following Equation, $$F_a(\{x_{ia}\}) = \begin{cases} -\infty & \text{if } \sum_{i \in I} x_{ia} \neq 1, \\ 0 & \text{otherwise.} \end{cases}$$

a second factor function among the predetermined factor function is defined as in the following Equation, $$G_i(\{x_{ia}\}, u_i) = \begin{cases} -\infty & \text{if } \sum_{a \in A} x_{ia} > M_i \\ & \text{or } u_i \neq \max_{a \in A} x_{ia}, \\ 0 & \text{if } \sum_{a \in A} x_{ia} = 0, \\ \dfrac{\sum_{a \in A} R_{ia} x_{ia}}{P_{all}(v, u_1) \sum_{b \in A} x_{ib}} & \text{otherwise.} \end{cases}$$

a third factor function among the predetermined factor function is defined as in the following Equation, $$H_i(z_{i1}, z_{i2}, \hat{v}) = \begin{cases} -\infty & \text{if } v_i \neq z_{i1} + z_{i2} \\ 0 & \text{otherwise} \end{cases}.$$

a fourth and fifth factor function among the predetermined factor function is defined as in the following Equation, $$H_{i1}(z_{i1}, z_{i-1,1}, u_i) = \begin{cases} -\infty & \text{if } z_{i1} \neq z_{i-1,1} + u_i, \\ 0 & \text{otherwise,} \end{cases}$$

$$H_{i2}(z_{i2}, z_{i-1,2}, u_i) = \begin{cases} -\infty & \text{if } z_{i-1,2} \neq z_{i2} + u_i, \\ 0 & \text{otherwise.} \end{cases}$$

7. The method of claim 6, wherein:
the message passing includes exchanging messages between factor function nodes corresponding to the predetermined factor function and variable nodes.

8. The method of claim 7, wherein:
the exchanged messages include, $\beta_{ia} = \mu_{x_{ia} \to F_a}(x_{ia}=1) - \mu_{x_{ia} \to F_a}(x_{ia}=0),$ $\eta_{ia} = \mu_{F_a \to x_{ia}}(x_{ia}=1) - \mu_{F_a \to x_{ia}}(x_{ia}=0),$ $\rho_{ia} = \mu_{x_{ia} \to G_i}(x_{ia}=1) - \mu_{x_{ia} \to G_i}(x_{ia}=0),$ $\alpha_{ia} = \mu_{G_i \to x_{ia}}(x_{ia}=1) - \mu_{G_i \to x_{ia}}(x_{ia}=0),$ $\rho_i = \mu_{u_i \to G_i}(u_i=1) - \mu_{u_i \to G_i}(u_i=0),$ $\alpha_i = \mu_{G_i \to u_i}(u_i=1) - \mu_{G_i \to u_i}(u_i=0),$ $\gamma_{ik} = \mu_{u_i \to H_{ik}}(u_i=1) - \mu_{u_i \to H_{ik}}(u_i=0),$ $\zeta_{ik} = \mu_{H_{ik} \to u\_i}(u_i=1) - \mu_{H_{ik} \to u_i}(u_i=0).$ 9. The method of claim 8, wherein:
the base station serving the a-th terminal is determined based on the following Equation, $$\hat{c}_a^{(t)} = \underset{i \in I}{\text{argmax}}\left(\tilde{\alpha}_{ia}^{(t)} + \tilde{\rho}_{ia}^{(t)}\right)$$

wherein:
t corresponds to an index of iteration,
$\tilde{\alpha}_{ia}^{(t)}$ corresponds to an estimated value of $\alpha_{ia}^{(t)}$,
$\tilde{\rho}_{ia}^{(t)}$ corresponds to the estimated value of $\rho_{ia}^{(t)}$, $\rho_i = \zeta_{i1} + \zeta_{i2}.$ 10. A apparatus of a base station controlling power in a distributive manner in a wireless communication system comprising:
a transceiver;
a memory and
a processor,
the processor comprising:
determining $u_i$ indicating a turn-on or turn-off state of an i-th base station based on mutual message passing with an adjacent base station in the i-th base station among B base stations;
determining $x_{ia}$ indicating whether a signal is transmitted to an a-th terminal among N terminals from the i-th base station; and obtaining an optimized value of the $u_i$ and the $x_{ia}$ which minimize total energy consumption consumed by the B base stations and simultaneously, maximize a data rate of the B base stations.

* * * * *